(12) United States Patent  (10) Patent No.: US 7,658,523 B2
Sugimoto  (45) Date of Patent: Feb. 9, 2010

(54) VEHICLE HEADLIGHT LEVELING DEVICE AND VEHICLE HEADLIGHT EQUIPPED WITH LEVELING DEVICE

(75) Inventor: Yuuki Sugimoto, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 11/984,264

(22) Filed: Nov. 15, 2007

(65) Prior Publication Data

US 2008/0123361 A1  May 29, 2008

(30) Foreign Application Priority Data

Nov. 24, 2006  (JP)  .............................. 2006-317313

(51) Int. Cl.
*B60Q 1/06* (2006.01)

(52) U.S. Cl. ...................... 362/526; 362/507; 362/508; 362/512; 362/528; 362/524

(58) Field of Classification Search ................ 362/526, 362/507, 508, 512, 515, 523, 524, 528
See application file for complete search history.

(56) References Cited

U.S. PATENT DOCUMENTS 4,916,587 A * 4/1990 Hirose et al. ................ 362/460
5,412,543 A * 5/1995 Kobayashi et al. .......... 362/524
5,673,991 A  10/1997 Eickhoff et al.
6,428,196 B1 * 8/2002 Deguchi et al. ............. 362/515
6,568,837 B2 * 5/2003 Denley ....................... 362/463

FOREIGN PATENT DOCUMENTS

| DE | 39 15019 A1 | 11/1989 |
|---|---|---|
| DE | 44 20779 C1 | 6/1995 |
| EP | 0 716 954 A2 | 6/1996 |
| EP | 1 122 127 A2 | 8/2001 |
| GB | 2 283 564 A | 5/1995 |
| JP | 57-126738 A | 8/1982 |
| JP | 60-034030 U | 3/1985 |
| JP | 01-282045 A | 11/1989 |
| JP | 1-282046 A | 11/1989 |
| JP | 05-085254 A | 4/1993 |
| JP | 7-186816 A | 7/1995 |
| JP | 08-164789 A | 6/1996 |
| JP | 11-028972 A | 2/1999 |
| JP | 2001-163116 A | 6/2001 |

* cited by examiner

*Primary Examiner*—Sandra L O'Shea
*Assistant Examiner*—Jessica L McMillan
(74) *Attorney, Agent, or Firm*—Foley & Lardner LLP (57) ABSTRACT

An axial direction of an output shaft of a motor is perpendicular to an axial direction of a shaft that moves back and forth with respect to a housing unit. A plurality of power-supplying terminals is symmetrically arranged with respect to a vertical line passing through a center of the shaft.

10 Claims, 5 Drawing Sheets

000
VEHICLE HEADLIGHT LEVELING DEVICE AND VEHICLE HEADLIGHT EQUIPPED WITH LEVELING DEVICE

CROSS-REFERENCE TO RELATED APPLICATIONS

The present application claims priority to and incorporates by reference the entire contents of Japanese priority document 2006-317313 filed in Japan on Nov. 24, 2006.

BACKGROUND OF THE INVENTION

1. Field of the Invention

The present invention relates to a vehicle headlight leveling device and a vehicle headlight that includes the leveling device.

2. Description of the Related Art

A conventional leveling device for a vehicle headlight such as a headlamp and a fog lamp is disclosed, for example, in Japanese Patent Application Laid-open No. 2001-163116. The conventional leveling device includes a casing, a motor arranged in the casing, and a shaft that moves back and forth by rotation of the motor. The motor and a circuit member that includes terminals for supplying an electric power to the motor are arranged on different sides with respect to a virtual surface that includes the shaft. When the motor is driven, the shaft moves back and forth to adjust an optical axis of the vehicle headlight.

Because the motor and the terminals are arranged on different sides with respect to the virtual surface that includes the shaft, when the conventional leveling device is used in a left-side vehicle headlight and in a right-side vehicle headlight, positions of terminals of the leveling device built in the left-side vehicle headlight (hereinafter, a left-side leveling device) and terminals of the leveling device built in the right-side vehicle headlight (hereinafter, a right-side leveling device) are biased on one side, either the left side or the right side with respect to each of the shafts. Thus, positions of connectors and lengths of harnesses for the terminals of the left-side leveling device and the terminals of the right-side leveling device differ from each other, resulting in a difference between the left-side vehicle headlight and the right-side vehicle headlight in a design and a layout of the connector and the harness. Consequently, it is difficult to have specifications of the left-side headlight and the right-side headlight in common.

SUMMARY OF THE INVENTION

It is an object of the present invention to at least partially solve the problems in the conventional technology A device for adjusting an optical axis of a headlight of a vehicle, according to one aspect of the present invention, includes a housing unit; a motor that is arranged in the housing unit; a shaft that moves back and forth with respect to the housing unit; a driving-force transmitting mechanism that is arranged between the motor and the shaft, and that transmits a driving force of the motor to the shaft; and a plurality of terminals for supplying an electric power to the motor. An axial direction of an output shaft of the motor is perpendicular or substantially perpendicular to an axial direction of the shaft. A shape of a layout of the terminals is substantially symmetric with respect to a vertical line passing through a center of the shaft.

A vehicle headlight according to another aspect of the present invention includes a fixing member; a tilting member that is mounted on the fixing member in a tiltable manner; and a leveling device for adjusting an optical axis of the vehicle headlight. The leveling device includes a housing unit, a motor that is arranged in the housing unit, a shaft that moves back and forth with respect to the housing unit, a driving-force transmitting mechanism that is arranged between the motor and the shaft, and that transmits a driving force of the motor to the shaft, and a plurality of terminals for supplying an electric power to the motor. The leveling device is arranged between the fixing member and the tilting member. An axial direction of an output shaft of the motor is perpendicular or substantially perpendicular to an axial direction of the shaft. A shape of a layout of the terminals is substantially symmetric with respect to a vertical line passing through a center of the shaft. The housing unit is attached to the fixing member. The shaft is mounted on the tilting member. The tilting member is tilted with respect to the fixing member through an operation of the leveling device to adjust the optical axis.

DETAILED DESCRIPTION OF THE PREFERRED EMBODIMENTS

Exemplary embodiments of the present invention are explained in detail below with reference to the accompanying drawings.

Figure 5:
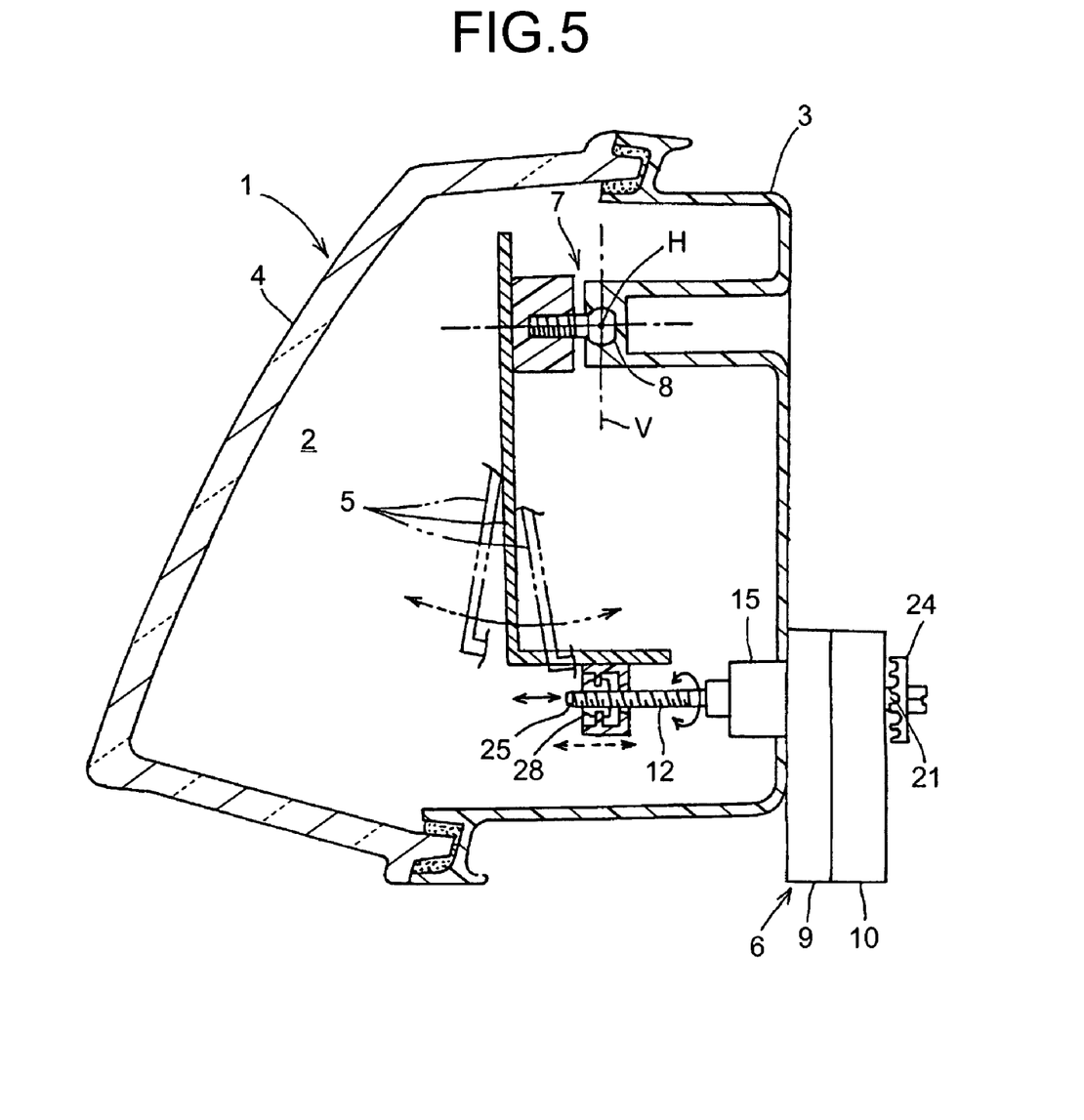
FIG. 5 is a vertical cross section of a headlamp for explaining an operation of adjusting an optical axis in an up-and-down direction of the headlamp.

A vehicle headlight leveling device and a vehicle headlight including the leveling device according to an embodiment of the present invention are explained by referring to FIG. 5.

FIG. 5 is a vertical cross section of a headlamp 1 for explaining an operation of adjusting an optical axis in an up-and-down direction of the headlamp 1. In the example shown in FIG. 5, the headlamp 1 is a head light of a vehicle. As shown in FIG. 5, the headlamp 1 includes a lamp housing 3 as a fixing member and a lamp lens 4 that divides a lamp chamber 2, an mounting bracket 5 as a tilting member that is arranged in the lamp chamber 2, and a leveling device 6 arranged between the lamp housing 3 and the mounting bracket 5.

The tilting member includes at least one lamp unit (not shown) and the mounting bracket 5 on which the lamp unit is mounted. The lamp unit is, for example, a projection type, a reflection type, or a direct projection-type lamp unit. The lamp unit emits a light from a light source (a semiconductor light source such as a light emitting diode (LED), a discharge lamp such as a high intensity discharge (HID) lamp, a halogen bulb, and an incandescent bulb) along a predetermined optical axis through the lamp lens 4 in a front direction of a vehicle in a predetermined light distribution pattern. A component of the lamp unit, for example, a reflector can be also used as the mounting bracket 5.

The mounting bracket 5 is attached to the lamp housing 3 via the leveling device 6 and a pivot mechanism 7 in a swingable manner up and down relative to a horizontal line H that passes through a center of a pivoting portion 8 of the pivot mechanism 7. An optical axis adjusting mechanism (not shown) for a lateral movement can be arranged between the lamp housing 3 and the mounting bracket 5. The tilting member can be arranged to adjust an optical axis left and right relative to a vertical line V that passes through the center of the pivoting portion 8.

Figure 4:
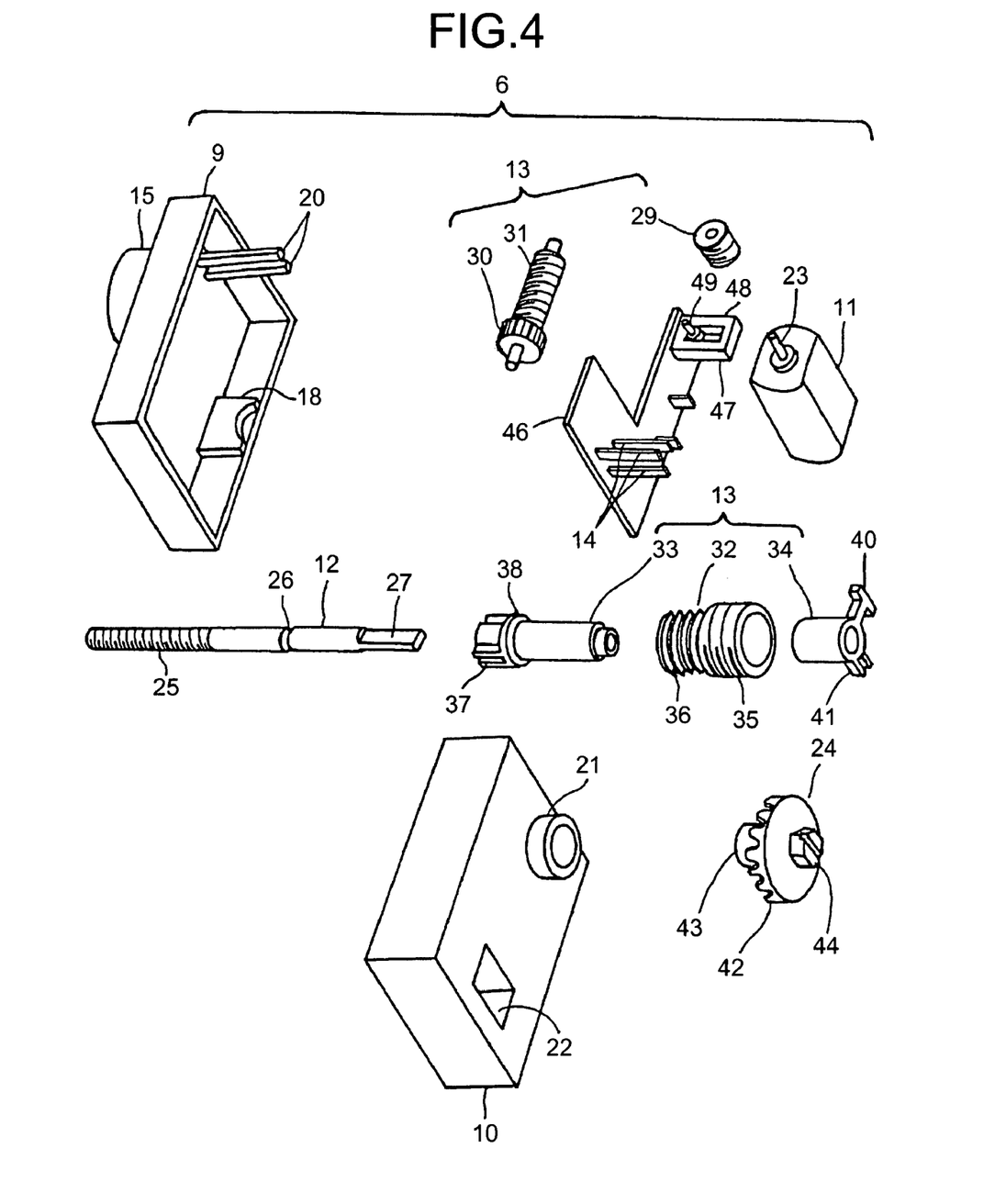
FIG. 4 is an exploded perspective view of components of the leveling device shown in FIG. 1.

As shown in FIG. 4, the leveling device 6 includes a housing unit including a front housing 9 and a rear housing 10, a motor 11, a shaft 12, a driving-force transmitting mechanism 13, and a plurality of power-supplying terminals 14 (three terminals are employed in the present embodiment).

The housing unit is divided into the front housing 9 and the rear housing 10, and the housing 9 and the housing 10 are detachably integrated or fixed to form the housing unit. The housings 9 and 10 are attached to the lamp housing 3.

A cylindrical portion 15 is integrally arranged substantially in the middle of an upper portion on an outer side of the front housing 9. A screw hole 16 is formed on an inner peripheral surface of the cylindrical portion 15. At least one convex portion 17 that prevents a first rod 33 from rotating is integrally arranged on the inner peripheral surface of the top of the cylindrical portion 15. A holding portion 18 for holding the motor 11 is integrally arranged substantially in the middle of an inner side of the front housing 9. Bearing portions 19 are arranged at an upper portion and a middle portion on the inner side of the front housing 9. Furthermore, a forked arm portion 20 that prevents a second rod 34 from rotating is integrally arranged substantially in the middle of the upper portion on the inner side of the housing 10 so that the forked arm portion 20 is aligned with an upper edge of the cylindrical portion 15.

A small cylindrical portion 21 is integrally arranged substantially in the middle of an upper portion on an outer side of the rear housing 10 to be on the same axis of the cylindrical portion 15 of the front housing 9. A concave 22 for inserting a connector (not shown) is formed substantially in the middle of a lower portion on the outer side of the rear housing 10.

The motor 11 includes an output shaft 23. The motor 11 that is held by the holding portion 18 is arranged in the housings 9 and 10.

The shaft 12 that is an adjust screw is arranged in the cylindrical portion 15 and the small cylindrical portion 21 via the driving-force transmitting mechanism 13 and a crown gear 24 so that the shaft 12 moves back and forth, that is, in an axial direction V1 of the shaft 12 and rotates with respect to the housings 9 and 10. A screw portion 25 is arranged at one end (a front end) of the shaft 12. A ring-shaped groove 26 is formed substantially in the middle of the shaft 12. A chamfered portion 27, which includes two planes preventing the shaft 12 from rotating, is arranged on the other end (a rear end) of the shaft 12.

A nut member 28 (a nut or a screw mounting) is screwed onto the screw portion 25 to move in the axial direction V1 (in a direction of a left-right arrow indicated by a solid line in FIG. 5). Because the nut member 28 is mounted on the mounting bracket 5, the shaft 12 is connected through the nut member 28 to the mounting bracket 5. The housings 9 and 10 are attached to the lamp housing 3. Therefore, the leveling device 6 is arranged between the lamp housing 3 as the fixing member and the mounting bracket 5.

When the shaft 12 moves back and forth with respect to the housings 9 and 10 in the direction of the left-right arrow indicated by the solid line in FIG. 5 (in the axial direction V1) by driving the motor 11, the nut member 28 moves back and forth together with the movement of the shaft 12 in a direction of a left-right arrow indicated by a broken line in FIG. 5. When the shaft 12 rotates with respect to the housings 9 and 10 in the direction of the left-right arrow indicated by the solid line in FIG. 5 by manually rotating the crown gear 24, the nut member 28 moves back and forth with respect to the shaft 12 in the direction of the left-right arrow indicated by the broken line in FIG. 5 by a screw movement. Hence, the tilting member including the mounting bracket 5 tilts up and down relative to the horizontal line H in a direction of a curved left-right arrow indicated by a two-dot chain line, so that an optical axis of the headlamp 1 is adjusted.

As shown in FIGS. 1 to 4, the driving-force transmitting mechanism 13 includes a first gear 29, a second gear 30, a worm 31 as a third gear, a worm wheel 32, and a cylindrical rod unit including the first rod 33 on one end side (a front end side) and the second rod 34 on the other end side (a rear end side). The first rod 33 and the second rod 34 are detachably integrated or fixed to constitute the cylindrical rod unit. The driving-force transmitting mechanism 13 is arranged between the motor 11 and the shaft 12 in the housings 9 and 10. A driving force of the motor 11 is transmitted to the shaft 12 via the driving-force transmitting mechanism 13 so that the shaft 12 moves back and forth with respect to the housings 9 and 10 in the direction (in the axial direction V1) of the left-right arrow indicated by the solid line in FIG. 5.

The first gear 29 is fixed to the output shaft 23 of the motor 11. The second gear 30 and the worm 31 are integrally formed and are rotatably supported by the bearing portions 19. The first gear 29 and the second gear 30 mesh with each other.

A worm wheel portion 35 is arranged on an outer peripheral surface of one end (a rear end) of the worm wheel 32. A screw portion 36 is arranged on an outer peripheral surface of the other end (a front end) of the worm wheel 32. The screw portion 36 is screwed into the screw hole 16 of the front housing 9 in the direction in which the shaft 12 moves back and forth. The worm wheel portion 35 meshes with the worm 31. Consequently, the worm wheel 32 moves back and forth with the shaft 12 and the rods 33 and 34 while rotating with respect to the housing 9 and 10 by a screw movement between the screw hole 16 and the screw portion 36 via the first gear 29, the second gear 30, the worm 31, and the worm wheel portion 35 by driving the motor 11.

At least one groove portion 37 that prevents the first rod 33 from rotating is arranged on an outer peripheral surface of the top of the first rod 33, and is engaged with the convex portion 17. A ring-shaped pressing portion 38 is integrally formed substantially in the middle of the outer peripheral surface of the first rod 33. A ring-shaped convex portion 39 that engages with the ring-shaped groove 26 is integrally formed substantially in the middle of an inner peripheral surface of the first rod 33. A protrusion portion 40 that prevents the second rod 34 from rotating and presses the worm wheel 32 is integrally arranged on an outer peripheral surface of the top of the second rod 34 in a radial direction of the second rod 34, and is engaged with the forked arm portion 20. The protrusion portion 40 is T-shaped when viewed from the front. A connection portion 41 is arranged on the outer peripheral surface of the top of the second rod 34 in the radial direction to make a predetermined angle (90 degrees in the present embodiment) with respect to the protrusion portion 40.

The convex portion 17 is engaged with the groove portion 37 of the first rod 33. The protrusion portion 40 is engaged with a middle groove of the forked arm portion 20. Therefore, the rods 33 and 34 are arranged in such a manner that the rods 33 and 34 do not rotate with respect to the housings 9 and 10 while moving in the direction in which the shaft 12 moves (in the axial direction V1). The rods 33 and 34 are inserted into the worm wheel 32. The ring-shaped pressing portion 38 of the first rod 33 and the protrusion portion 40 of the second rod 34 press against both ends of the worm wheel 32. Thus, the rods 33 and 34 are arranged in the worm wheel 32 so that the rods 33 and 34 rotate and do not move in the back and forth direction of the shaft 12 with respect to the worm wheel 32. As a result, when the motor 11 is driven, the rods 33 and 34 move back and forth with the worm wheel 32 and the shaft 12 without rotating with respect to the housings 9 and 10.

The shaft 12 is inserted into the rods 33 and 34. The ring-shaped groove 26 and the ring-shaped convex portion 39 are engaged with each other. Consequently, the shaft 12 is arranged in such a manner that the shaft 12 rotates and do not move in the axial direction V1 with respect to the rods 33 and 34. The shaft 12 moves back and forth in the axial direction V1 with the worm wheel 32 and the rods 33 and 34.

The crown gear 24 includes a crown gear portion 42, a cylindrical shaft portion 43, and a hexagonal head portion 44. The cylindrical shaft portion 43 is integrally formed on one disk-shaped surface (a front surface) of the crown gear portion 42. The hexagonal head portion 44 is integrally formed on the other disk-shaped surface (a rear surface) of the crown gear portion 42. A chamfered groove 45 that includes two planes and prevents the shaft 12 from rotating is formed from one end surface (a front end surface) of the cylindrical shaft portion 43 to the other end surface (a rear end surface) of the hexagonal head portion 44. The cylindrical shaft portion 43 is arranged in the small cylindrical portion 21, so that the cylindrical shaft portion 43 rotates and without moving in an axial direction (in the axial direction V1) of the small cylindrical portion 21 and the cylindrical shaft portion 43.

The chamfered portion 27 is inserted into the chamfered groove 45. Consequently, the shaft 12 cannot rotate but can move back and forth in the axial direction V1 with respect to the crown gear 24. Thus, the shaft 12 rotates together with the crown gear 24 with respect to the housing 9 and 10 by manually rotating the crown gear 24.

The shaft 12 is arranged in such a manner that the shaft 12 moves back and forth in the axial direction V1 and rotates with respect to the housings 9 and 10 through the driving-force transmitting mechanism 13 (the worm wheel 32 and the rods 33 and 34) and the crown gear 24. Consequently, the shaft 12 moves back and forth in the direction of the left-right arrow (in the axial direction V1) indicated by the solid line in FIG. 5 with respect to the housings 9 and 10 by driving the motor 11 and rotates with the crown gear 24 with respect to the housings 9 and 10 by manually rotating the crown gear 24.

Figure 1:
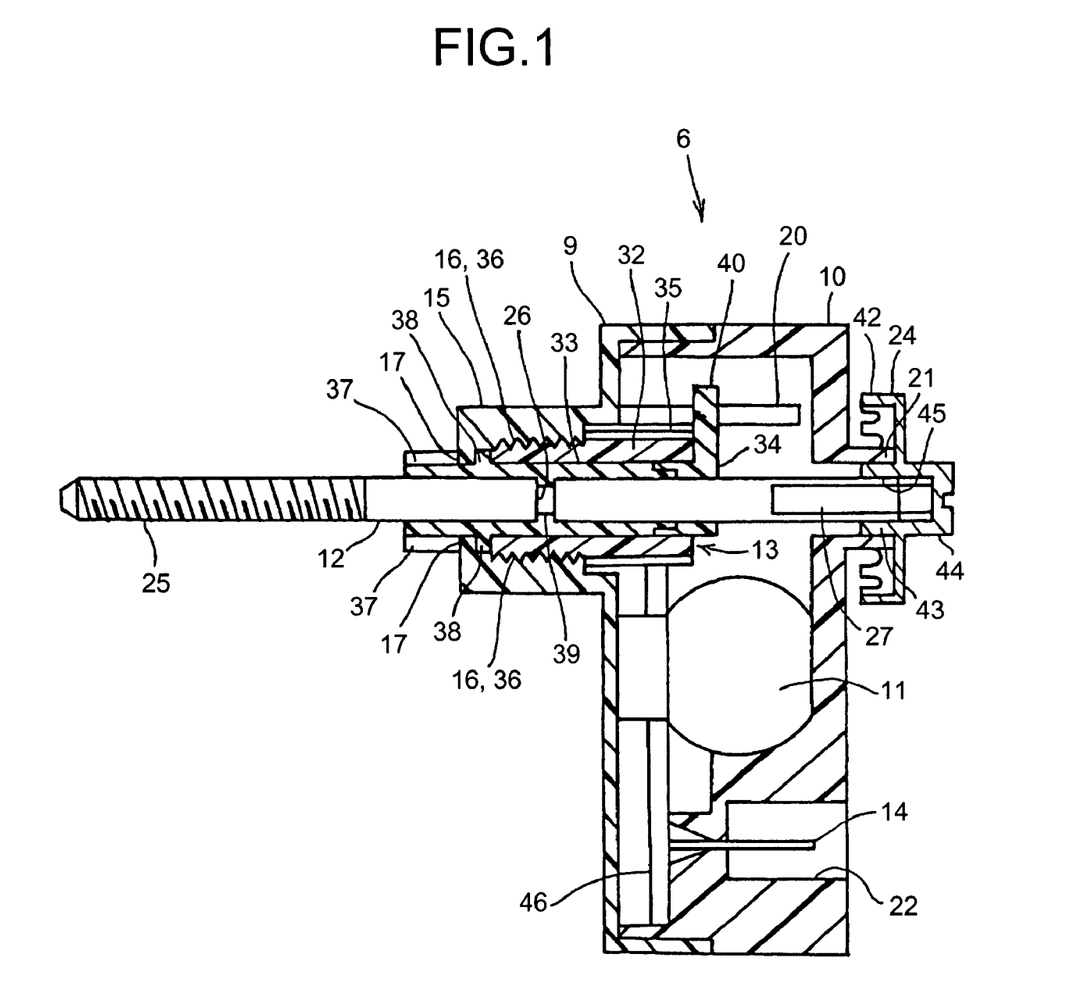
FIG. 1 is a vertical cross section of a leveling device for a vehicle headlight according to an embodiment of the present invention.
Figure 2:
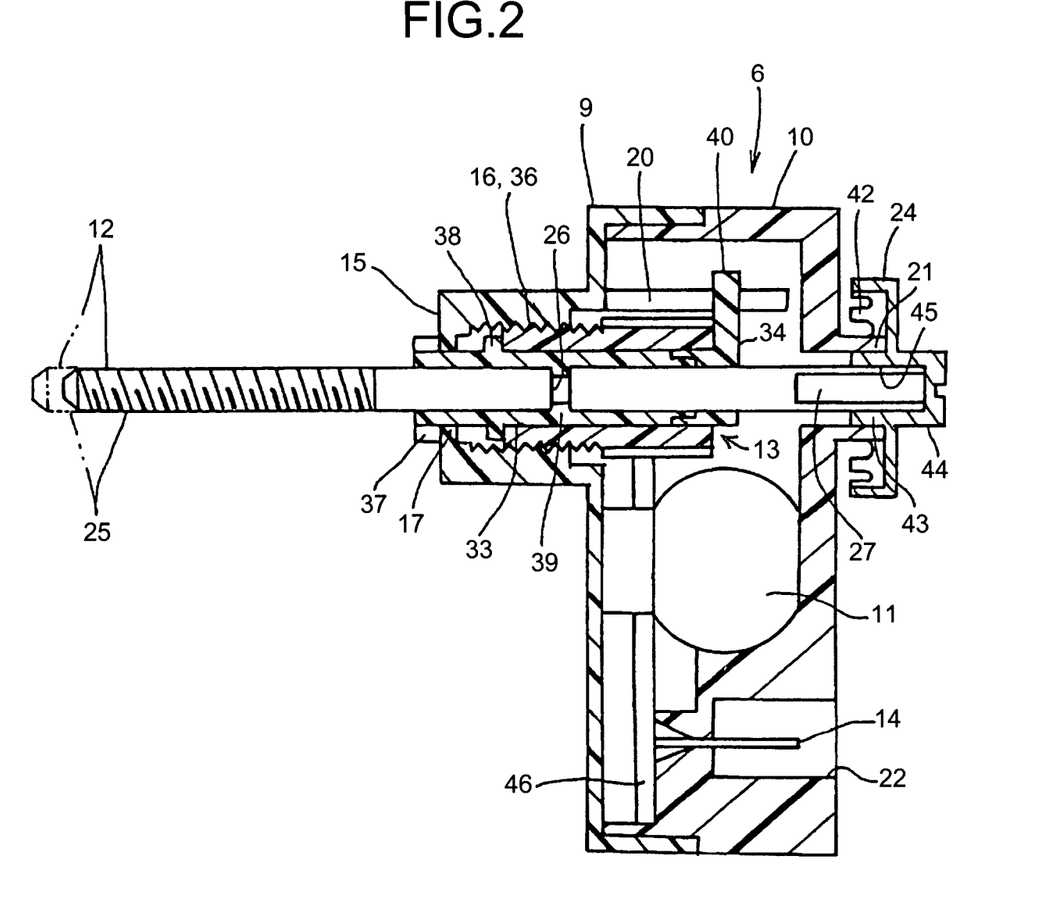
FIG. 2 is a vertical cross section of the leveling device in which a shaft shown in FIG. 1 recedes.
Figure 3:
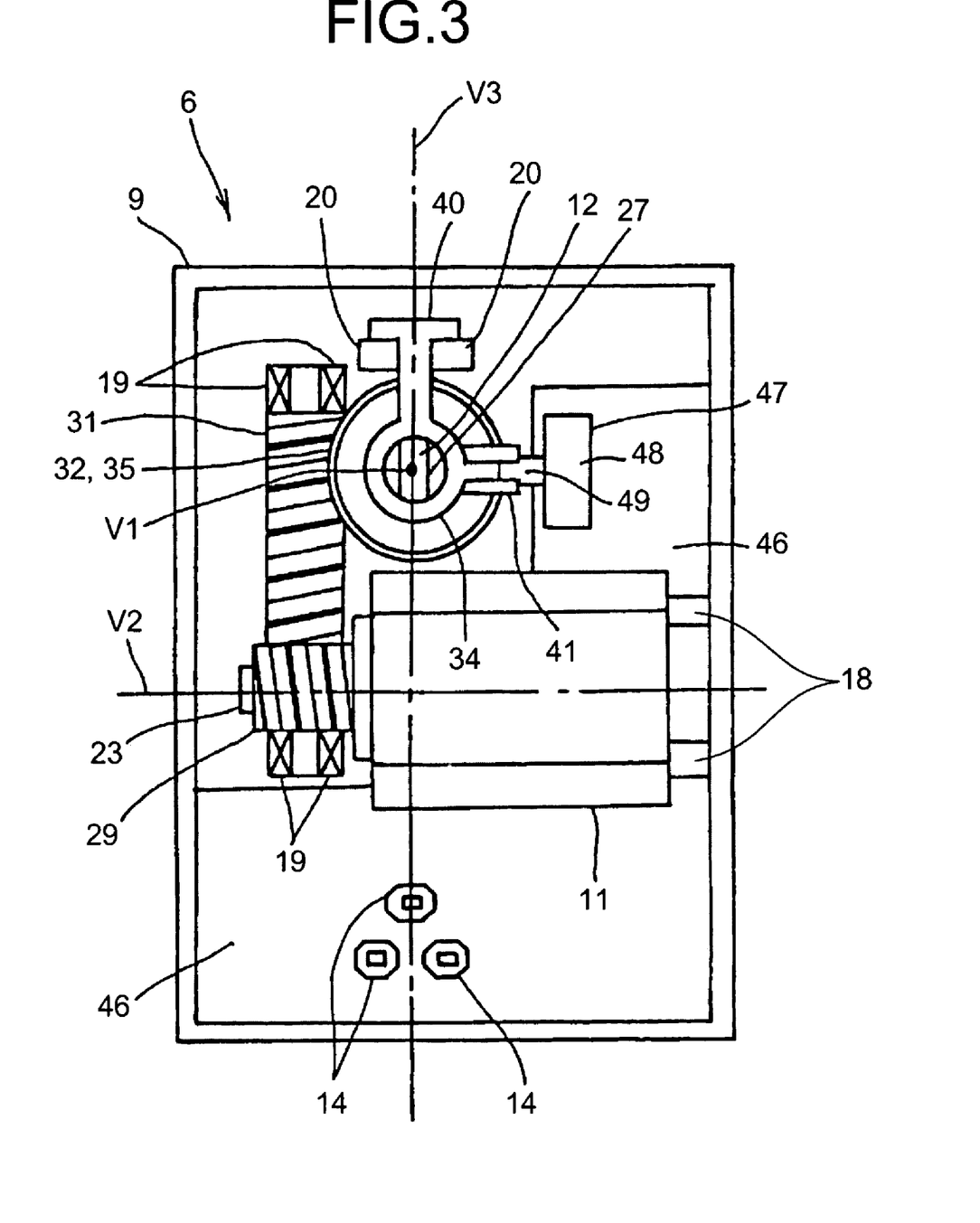
FIG. 3 is a rear view of the leveling device with a rear housing and a crown gear removed, representing an inside of a front housing of the leveling device.

As shown in FIG. 3, an axial direction V2 of the output shaft 23 is perpendicular to the axial direction V1. The motor 11 is arranged between the shaft 12 and the power-supplying terminals 14. An electric power is supplied from the power-supplying terminals 14 to the motor 11.

The power-supplying terminals 14 are attached to a printed circuit board 46 mounted on the housings 9 and 10. As shown in FIG. 3, a shape of a layout of the power-supplying terminals 14 is symmetric relative to a vertical line V3 that passes a center of the shaft 12. Electronic components (not shown) such as a capacitor and a hybrid IC are mounted on the printed circuit board 46.

A position sensor 47 is arranged between the printed circuit board 46 and the second rod 34. The position sensor 47 utilizing a sliding resistor includes a sliding portion 49 and a body portion 48 that incorporates a resistor. The body portion 48 is attached to the printed circuit board 46. The sliding portion 49 that is connected to the connection portion 41 moves with the second rod 34, so that a resistance of the resistor in the body portion 48 varies. A moving amount of the sliding portion 49, that is, a tilting angle of the optical axis of the headlamp 1 in the vertical direction, can be measured based on the variation of the resistance.

By connecting the position sensor 47, the power-supplying terminals 14, and the motor 11 to a controller (not shown) of an auto-leveling system, an optical axis of the headlamp 1 in an up-and-down direction can be automatically adjusted in response to variation of a direction of a vehicle.

An initial setting of an optical axis in the up-and-down direction of the headlamp 1 is explained. The crown gear portion 42, the hexagonal head portion 44, or a groove formed in the hexagonal head portion 44 is held by a tool to manually rotate the crown gear 24.

The chamfered groove 45 of the crown gear 24 is engaged with the chamfered portion 27 of the shaft 12, so that the shaft 12 rotates. The shaft 12 is inserted into the rods 33 and 34, and the ring-shaped groove 26 of the shaft 12 and the ring-shaped convex portion 39 of the first rod 33 are engaged with each other. Therefore, the shaft 12 rotates without moving back and forth in the axial direction V1 with respect to the rods 33 and 34, and the rods 33 and 34 do not rotate. Thus, the rotation of the shaft 12 does not affect the driving-force transmitting mechanism 13 and the motor 11 through the rods 33 and 34.

When the shaft 12 rotates in the direction of the left-right arrow indicated by the solid line in FIG. 5 with respect to the housings 9 and 10 by manually rotating the crown gear 24, the nut member 28 screwed onto the screw portion 25 moves back and forth in the axial direction V1 by a screw movement. The movement of the nut member 28 causes the tilting member including the mounting bracket 5 to tilt up and down relative to the horizontal line H in the direction of the curved left-right arrow indicated by the two-dot chain line in FIG. 5, so that the initial setting of the optical axis in the up-and-down direction of the headlamp 1 is performed.

When a light source of a lamp unit in the headlamp 1 is turned on, a light from the light source is emitted along a predetermined optical axis through the lamp lens 4 forward of a vehicle in a predetermined distribution pattern.

When a direction of a vehicle changes, the controller of the auto-leveling system detects a change of the direction and drives the motor 11. When the motor 11 is driven, a driving force of the motor 11, that is, a rotating force of the output shaft 23, is transmitted to the worm wheel 32 through the first gear 29, the second gear 30, the worm 31, and the worm wheel portion 35. Because the screw portion 36 of the worm wheel 32 is screwed into the screw hole 16 of the housing 9, the worm wheel 32 moves back and forth in the axial direction V1 while rotating with respect to the housing 9 and 10 by a screw movement.

Both ends of the worm wheel 32 are sandwiched between the ring-shaped pressing portion 38 and the protrusion portion 40, so that the rods 33 and 34 move back and forth in the axial direction V1 with the worm wheel 32 with respect to the housing 9 and 10. At this time, the groove portion 37 is engaged with the convex portion 17. The protrusion portion 40 is engaged with the forked arm portion 20. Moreover, the rod 33 and 34 are inserted into the worm wheel 32. Therefore, the back-and-forth movement of the worm wheel 32 is transmitted to the rods 33 and 34 without the rotating force of the worm wheel 32 being transmitted to the rods 33 and 34. Consequently, the rods 33 and 34 move back and forth with the worm wheel 32 without making a rotation with respect to the housings 9 and 10.

The ring-shaped convex portion 39 and the ring-shaped groove 26 are engaged with each other, so that the shaft 12 moves back and forth with the rods 33 and 34 and the worm wheel 32 in the axial direction V1 with respect to the housings 9 and 10. At this time, the shaft 12 is inserted into the rods 33 and 34, the chamfered portion 27 is inserted into the chamfered groove 45, and the crown gear 24 is mounted on the rear housing 10 in such a manner that the crown gear 24 can not move back and forth in the axial direction V1. Hence, the shaft 12 moves back and forth with the worm wheel 32 and the rods 33 and 34 without rotating with respect to the housings 9 and 10.

The nut member 28 is screwed onto the screw portion 25. Therefore, when the shaft 12 moves back and forth with respect to the housings 9 and 10 in the direction (in the axial direction V1) of the left-right arrow indicated by the solid line in FIG. 5 by driving the motor 11, the nut member 28 moves back and forth with the back-and-forth movement of the shaft 12 in the direction of the left-right arrow indicated by the broken line in FIG. 5. Consequently, the tilting member that includes the mounting bracket 5 tilts up and down relative to the horizontal line H in the direction of the curved left-right arrow indicated by the two-dot chain line in FIG. 5, so that an optical axis of the headlamp 1 is automatically adjusted in response to a change of a direction of a vehicle.

According to the embodiment, as shown in FIG. 3, a shape of a layout of the power-supplying terminals 14 is symmetric relative to the vertical line V3 passing through the center of the shaft 12. Therefore, it is possible to have specifications of the left-side leveling device and the right-side leveling device in common. In other words, when the leveling devices 6 are employed in the left-side vehicle headlight and in the right-side vehicle headlight, the power-supplying terminals 14 of the left-side leveling device 6 and the power-supplying terminals 14 of the right-side leveling device 6 are each symmetric in shape of a layout relative to the vertical line V3 passing through the center of the shaft 12. Thus, a position of a connector (not shown) connected to the power-supplying terminals 14 of the left-side leveling device 6 and a position of a connector (not shown) connected to the power-supplying terminals 14 of the right-side leveling device 6 are the same. Furthermore, a length of a harness (not shown) connected to the power-supplying terminals 14 of the left-side leveling device 6 and a length of a harness (not shown) connected to the power-supplying terminals 14 of the right-side leveling device 6 are the same. As a result, connectors and harnesses can be the same in design and layout in the left-side vehicle headlight and the right-side vehicle headlight, so that the left-side vehicle headlight and the right-side vehicle headlight can be in common.

Furthermore, according to the embodiment, the axial direction V2 of the output shaft 23 is perpendicular to the axial direction V1 of the shaft 12. Accordingly, compared with a leveling device in which an axial direction of an output shaft of a motor and an axial direction of a shaft are the same, the housings 9 and 10 can be reduced in thickness (a length in the direction in which the shaft 12 moves back and forth), thereby reducing the size of the leveling device.

Moreover, according to the embodiment, as shown in FIG. 3, the motor 11 is arranged between the shaft 12 and the power-supplying terminals 14. Therefore, the driving-force transmitting mechanism 13 is positioned on a side in which the motor 11 and the shaft 12 are arranged and a room can be obtained to accommodate control components for driving the motor on a side in which the power-supplying terminals 14 are arranged, thereby further reducing the size of the leveling device.

Furthermore, according to the embodiment, the worm wheel 32 moves back and forth with the shaft 12 by a screw movement caused by driving the motor 11 while rotating with respect to the housings 9 and 10. Compared with a driving-force transmitting mechanism in Japanese Patent Application Laid-open No. 2001-163116 in which an adjusting screw moves back and forth with respect to a casing by a worm wheel that only rotates with respect to the casing, the leveling device 6 enables the shaft 12 to reliably move back and forth with respect to the housings 9 and 10 and an optical axis to be reliably adjusted.

Moreover, according to the embodiment, the position sensor 47 arranged between the printed circuit board 46 and the second rod 34 enables an optical axis to be accurately adjusted. In addition, because the shaft 12 can be manually rotated with respect to the housings 9 and 10 to adjust an optical axis, an initial setting can be performed apart from automatic adjustment of an optical axis by driving the motor 11.

Furthermore, according to the embodiment, because the headlamp 1 as the vehicle headlight includes the leveling device 6, the headlamp 1 can achieve substantially the same effect as that of the leveling device 6.

Although the headlamp 1 as the vehicle headlight that includes the leveling device 6 is explained in the embodiment, the leveling device 6 can be also applied to a vehicle headlight other than the headlamp 1.

Furthermore, although the rods 33 and 34 are interposed between the shaft 12 and the worm wheel 32 in the embodiment, the shaft 12 and the worm wheel 32 can be arranged without interposing the rods.

Furthermore, although the position sensor 47 is provided in the embodiment, the position sensor 47 can be eliminated.

Moreover, although an optical axis can be adjusted by manually rotating the shaft 12 by using the crown gear 24 in the embodiment, the adjustment of an optical axis may not be performed by manually rotating the shaft 12.

Furthermore, although the lamp housing 3 is used as a fixing member and the lamp unit and the mounting bracket 5 are used as a tilting member in the embodiment, a vehicle body can be used as a fixing member and the whole vehicle headlight can be used as a tilting member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device for adjusting an optical axis of a headlight of a vehicle, the device comprising:
   a housing unit that includes an arm;
   a motor that is arranged in the housing unit;
   a worm wheel that is threadably mounted on the housing;
   a rod that is rotatably arranged inside the worm wheel;
   a shaft that is configured to move back and forth with respect to the housing unit and is rotatably arranged inside the rod;
   a crown gear having a chamfered groove engaging with a chamfered portion of the shaft;
   a driving-force transmitting mechanism that is arranged between the motor and the shaft, and that transmits a driving force of the motor to the shaft; and
   a plurality of terminals for supplying an electric power to the motor, wherein
   the rod includes a ring-shaped pressing portion and a protrusion portion on an outer surface thereof;
   the worm wheel is arranged between the ring-shaped pressing portion and the protrusion portion to transmit an axial movement to the rod;

the protrusion portion of the rod is fitted into the arm of the housing so that the rod withholds from a rotation of the worm wheel;

the shaft includes a ring-shaped groove to engage with a ring-shaped convex portion of the rod;

an axial direction of an output shaft of the motor is perpendicular or substantially perpendicular to an axial direction of the shaft, and a shape of a layout of the terminals is substantially symmetric with respect to a vertical line passing through a center of the shaft.

2. The device according to claim 1, wherein the motor is arranged between the shaft and the terminals.

3. The device according to claim 2, wherein a position sensor is arranged between the housing unit and the rod unit, and the shaft is arranged in such a manner that the shaft moves back and forth and rotates with respect to the housing unit, moves back and forth with respect to the housing unit by driving of the motor, and manually rotates with respect to the housing unit to adjust the optical axis of the vehicle headlight.

4. The device according to claim 1, wherein the driving-force transmitting mechanism includes either one of a gear or a gear group mounted around the output shaft of the motor to engage with the worm wheel.

5. The device according to claim 1, wherein the housing unit comprises a screw hole, and the worm wheel comprises a screw portion on an outer peripheral portion of the worm wheel which engages with the screw hole.

6. A vehicle headlight comprising:

a fixing member;

a tilting member that is mounted on the fixing member in a tiltable manner; and a leveling device for adjusting an optical axis of the vehicle headlight, including a housing unit that includes an arm, a motor that is arranged in the housing unit, a worm wheel that is threadably mounted on the housing;

a rod that is rotatably arranged inside the worm wheel;

a shaft that is configured to move back and forth with respect to the housing unit and is rotatably arranged inside the rod;

a crown gear having a chamfered groove engaging with a chamfered portion of the shaft;

a driving-force transmitting mechanism that is arranged between the motor and the shaft, and that transmits a driving force of the motor to the shaft; and a plurality of terminals for supplying an electric power to the motor, wherein the rod includes a ring-shaped pressing portion and a protrusion portion on an outer surface thereof;

the worm wheel is arranged between the ring-shaped pressing portion and the protrusion portion to transmit an axial movement to the rod;

the protrusion portion of the rod is fitted into the arm of the housing so that the rod withholds from a rotation of the worm wheel;

the shaft includes a ring-shaped groove to engage with a ring-shaped convex portion of the rod;

the leveling device is arranged between the fixing member and the tilting member, an axial direction of an output shaft of the motor is perpendicular or substantially perpendicular to an axial direction of the shaft, a shape of a layout of the terminals is substantially symmetric with respect to a vertical line passing through a center of the shaft, the housing unit is attached to the fixing member, the shaft is mounted on the tilting member, and the tilting member is tilted with respect to the fixing member through an operation of the leveling device to adjust the optical axis.

7. The vehicle headlight according to claim 6, wherein the motor is arranged between the shaft and the terminals.

8. The vehicle headlight according to claim 7, wherein a position sensor is arranged between the housing unit and the rod unit, and the shaft is arranged in such a manner that the shaft moves back and forth and rotates with respect to the housing unit, moves back and forth with respect to the housing unit by driving of the motor, and manually rotates with respect to the housing unit to adjust the optical axis of the vehicle headlight.

9. The vehicle headlight according to claim 6, wherein the driving-force transmitting mechanism includes either one of a gear or a gear group mounted around the output shaft of the motor to engage with the worm wheel.

10. The vehicle headlight according to claim 6, wherein the housing unit comprises a screw hole, and the worm wheel comprises a screw portion on an outer peripheral portion of the worm wheel which engages with the screw hole.

* * * * *